US012623658B2

(12) United States Patent
Deborne et al.

(10) Patent No.: US 12,623,658 B2
(45) Date of Patent: May 12, 2026

(54) METHOD FOR ASSISTING IN KEEPING A VEHICLE ON THE ROAD IN THE EVENT OF LANE NARROWING OR WIDENING

(71) Applicant: AMPERE S.A.S., Boulogne Billancourt (FR)

(72) Inventors: Renaud Deborne, Guyancourt (FR); Raphael Quilliard, Guyancourt (FR)

(73) Assignee: AMPERE S.A.S., Boulogne Billancourt (FR)

( * ) Notice: Subject to any disclaimer, the term of this patent is extended or adjusted under 35 U.S.C. 154(b) by 25 days.

(21) Appl. No.: 18/716,849

(22) PCT Filed: Nov. 24, 2022

(86) PCT No.: PCT/EP2022/083129
§ 371 (c)(1),
(2) Date: Jun. 5, 2024

(87) PCT Pub. No.: WO2023/104532
PCT Pub. Date: Jun. 15, 2023

(65) Prior Publication Data
US 2025/0026342 A1 Jan. 23, 2025

(30) Foreign Application Priority Data
Dec. 10, 2021 (FR) ...................................... 2113268

(51) Int. Cl.
*B60W 30/12* (2020.01)
*G06V 10/82* (2022.01)
(Continued)

(52) U.S. Cl.
CPC ............. *B60W 30/12* (2013.01); *G06V 10/82* (2022.01); *G06V 20/588* (2022.01);
(Continued)

(58) Field of Classification Search
CPC .......................... G06F 18/24143; G06N 3/044; G06N 3/0442; G06N 3/045; G06N 3/048;
(Continued)

(56) References Cited

U.S. PATENT DOCUMENTS 10,402,995 B2 * 9/2019 Kwant ................. G06V 20/588
11,155,259 B2 * 10/2021 Yao .......................... G06T 7/277
(Continued)

FOREIGN PATENT DOCUMENTS

FR 3 069 222 A1 1/2019

OTHER PUBLICATIONS

International Search Report Issued Jan. 10, 2023, in PCT/EP2022/083129, filed on Nov. 24, 2022, 2 pages.
French Search Report Issued Jul. 26, 2022, in FR 2113268, filed on Dec. 10, 2021, 3 pages (with Translation of Categories).

*Primary Examiner* — Hai H Huynh
*Assistant Examiner* — Johnny H Hoang
(74) *Attorney, Agent, or Firm* — Oblon, McClelland, Maier & Neustadt, L.L.P.

(57) ABSTRACT

A method is for detecting the route taken by a motor vehicle in a particular zone within which the number of lanes increases or decreases. The method includes recording position data characterizing the position of the motor vehicle in relation to the lane separation lines marked on the road and calculating, via a recurrent neural network, at least one parameter for the detection of the particular zone, the recorded position data being supplied as input to the recurrent neural network.

14 Claims, 2 Drawing Sheets

(51) Int. Cl.
 *G06V 20/56* (2022.01)
 *G06V 20/58* (2022.01)

(52) U.S. Cl.
 CPC ... *B60W 2420/403* (2013.01); *B60W 2540/18* (2013.01); *B60W 2552/10* (2020.02); *B60W 2552/53* (2020.02)

(58) Field of Classification Search
 CPC .... G06N 3/084; G06V 10/454; G06V 10/588; G06V 10/764; G06V 10/82; G06V 20/588; B60W 30/12; B60W 40/06; B60W 2420/403; B60W 2552/10; B60W 2552/53; B60W 2710/207; B60W 2540/18; G06T 7/254; G06T 7/11; G06T 7/194; G06T 7/215; G06T 11/60; G06T 2207/20084; G06T 2207/30252; G06T 2207/10016; G01C 21/365; G01C 21/3415; G01C 21/3647; G01C 21/3691
 USPC ...................................................... 701/41–48
 See application file for complete search history.

(56) References Cited

U.S. PATENT DOCUMENTS

| | | | | |
|---|---|---|---|---|
| 11,313,695 | B2 * | 4/2022 | Yu | G06T 7/254 |
| 11,829,275 | B2 * | 11/2023 | Arechiga Gonzalez | G01M 17/007 |
| 2017/0242443 | A1 * | 8/2017 | Schuh | G08G 1/163 |
| 2018/0120859 | A1 | 5/2018 | Eagelberg et al. | |
| 2019/0049267 | A1 * | 2/2019 | Huang | G01C 21/3697 |
| 2019/0163991 | A1 | 5/2019 | Tian et al. | |
| 2020/0041612 | A1 * | 2/2020 | Harrison | G01S 7/40 |
| 2020/0210812 | A1 * | 7/2020 | Baker | G06N 3/044 |
| 2021/0072765 | A1 | 3/2021 | Eagelberg et al. | |
| 2021/0078603 | A1 * | 3/2021 | Nakhaei Sarvedani | B60W 30/18163 |
| 2021/0148719 | A1 * | 5/2021 | Xu | G01C 21/3602 |
| 2022/0247188 | A1 * | 8/2022 | Manikfan | H02J 3/32 |
| 2022/0283591 | A1 | 9/2022 | Eagelberg et al. | |

* cited by examiner

| t | pos_L | pos_R | Dif_Nxt_L | Dif_Nxt_R | Ps | Pm | Po |
|---|---|---|---|---|---|---|---|
| t0 | d1t0 | d2t0 | d3t0 | d4t0 | Pst0 | Pmt0 | Pot0 |
| t1 | d1t1 | d2t1 | d3t1 | d4t1 | Pst1 | Pmt1 | Pot1 |
| t2 | d1t2 | d2t2 | d3t2 | d4t2 | Pst2 | Pmt2 | Pot2 |
| t3 | d1t3 | d2t3 | d3t3 | d4t3 | Pst3 | Pmt3 | Pot3 |
|  |  |  |  |  |  |  |  |
|  |  |  |  |  |  |  |  |
| ti | d1ti | d2ti | d3ti | d4ti | Psti | Pmti | Poti |

Fig. 4
201
| t0 | Pst0 | Pmt0 | Pot0 | d1t0 | d2t0 | d3t0 | d4t0 | Pst1 | Pmt1 | Pot1 |
|---|---|---|---|---|---|---|---|---|---|---|
| t1 | Pst1 | Pmt1 | Pot1 | d1t1 | d2t1 | d3t1 | d4t1 | Pst2 | Pmt2 | Pot2 |
| t2 | Pst2 | Pmt2 | Pot2 | d1t2 | d2t2 | d3t2 | d4t2 | Pst3 | Pmt3 | Pot3 |
|  |  |  |  |  |  |  |  |  |  |  |
| ti-1 | Psti-1 | Pmti-1 | Poti-1 | d1ti-1 | d2ti-1 | d3ti-1 | d4ti-1 | Psti | Pmti | Poti |
Fig. 5
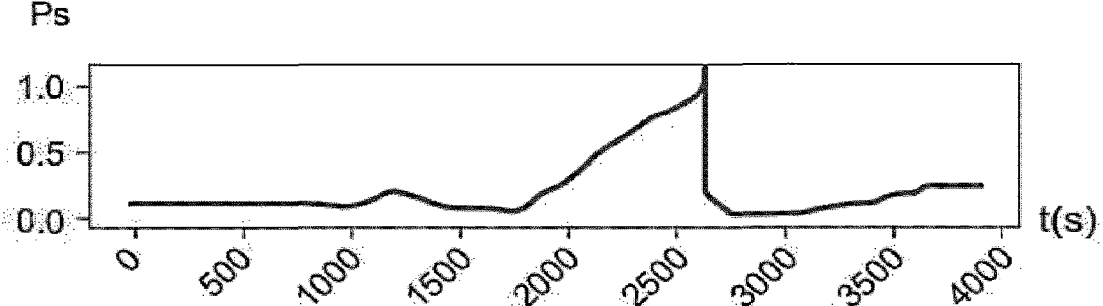
Fig. 6
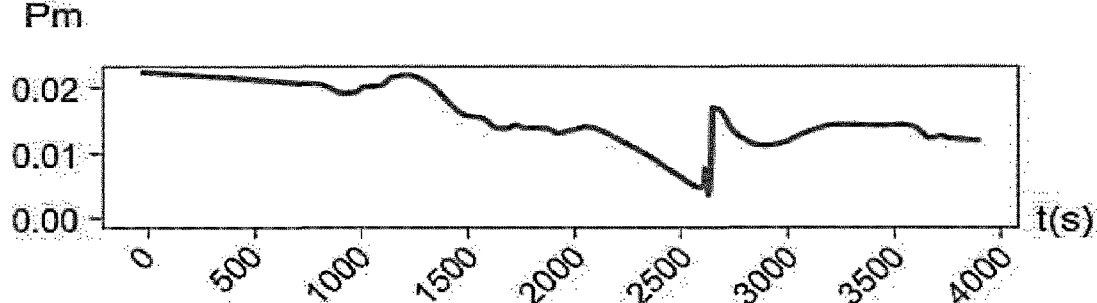
Fig. 7
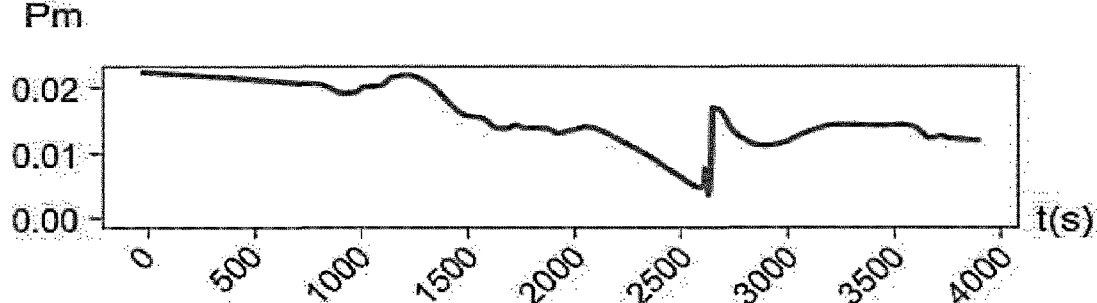

METHOD FOR ASSISTING IN KEEPING A VEHICLE ON THE ROAD IN THE EVENT OF LANE NARROWING OR WIDENING

TECHNICAL FIELD OF THE INVENTION

The present invention generally relates to the field of advanced driver-assistance systems.

It more particularly relates to a method for detecting, by means of a computer located on-board a vehicle being driven on a road, each singular zone of the road within which the number of traffic lanes increases or decreases.

It also relates to a method for assisting with keeping the motor vehicle in its traffic lane and to a method for parameterizing the on-board computer.

PRIOR ART

Some motor vehicles are currently equipped with an image-capturing device designed to detect the position of road line markings delineating traffic lanes. The position of the lines, around and in front of the vehicle, makes it possible to implement guidance systems to assist with driving. These guidance systems may for example be LCA systems (LCA standing for Lane Centering Assist) that keep the vehicle equidistant between a right line and a left line.

Road widening, for example due to a splitting of a traffic lane into two, an intersection or a freeway exit, may nevertheless cause these guidance systems to make mistakes. Thus, in the case where a single traffic lane splits into two parallel traffic lanes, there is a risk of the LCA system guiding the vehicle to straddle the two new lanes, before abruptly returning the vehicle to one of the two lanes when the marking between these two lanes appears. The same type of problem is liable to occur when a road narrows.

Poor detection of line position may also cause guidance systems to make mistakes. For example, if the vehicle confuses a shadow or reflection with a line, the guidance system may cause the vehicle to follow this shadow or reflection and therefore guide the vehicle out of its lane.

Generally, lane widening and narrowing may fool guidance systems and/or cause them to follow paths that are sub-optimal in terms of safety, distance travelled or energy consumed.

To limit these drawbacks, document FR3109920 discloses a method comprising steps of:

detecting, on the basis of the variation in the distance separating the right and left lines, widening of said lane, then, when widening is detected, acquiring the path of the motor vehicle, selecting, from the right and left lines, a line diverging least from the path, and guiding the motor vehicle depending on said position of the selected line.

This method, although it often proves effective, sometimes malfunctions in ways that it would be desirable to prevent.

PRESENTATION OF THE INVENTION

More precisely, the present invention provides a solution that allows widening and narrowing of a road to be better detected.

Thus, according to the invention, a method is provided for detecting a singular zone within which the number of traffic lanes increases or decreases, comprising steps of:

reading position data of the motor vehicle being driven on the road with respect to lane separation lines marked on the road, and computing, by means of a recurrent neural network, at least one parameter of detection of a singular zone, the read position data being delivered as input to said recurrent neural network.

Thus, the invention makes provision to employ a very particular type of neural network, namely a recurrent neural network, to detect singular zones.

Specifically, it turns out that this type of network, once trained, allows highly satisfactory detection as the vehicle moves along a road and the width of the road varies.

The use of a non-recurrent neural network would not allow results as reliable as those obtained here to be achieved.

This solution, using neural networks, is perfectly applicable in many situations, for example in countries where traffic drives on the right or left of the road.

It gives good results when it is coupled with the LCA function, not only on roads where the number of traffic lanes actually varies, but also on roads where the number of traffic lanes remains constant but where certain line markings are not sufficiently visible, so that the computer located on board the vehicle mistakenly perceives a variation in the number of traffic lanes. Specifically, by virtue of the invention, the number of errors in detection of singular zones is reduced. Furthermore, in case of error, the guidance solution employed in the LCA function makes it possible to pass through the singular zone without any problem and without requiring this function to be deactivated. In this way, in practice, it is rare for the LCA function to be disabled randomly and in a manner which is uncomfortable to the driver.

The following are other advantageous and non-limiting features of the detecting method according to the invention, which features may be implemented individually or in any technically possible combination:

at least two parameters are computed, including a parameter of detection of an increase in the number of traffic lanes, and a parameter of detection of a reduction in the number of traffic lanes;

the recurrent neural network comprises an input layer, an output layer, and at least a first hidden layer comprising an attention mechanism;

the attention mechanism is of LSTM type;

said first hidden layer comprises several tens of neurons;

the output layer is an activation layer and at least one densifying other hidden layer, which is located after said first hidden layer and in which the number of neurons is equal to the number of neurons in the output layer, is provided.

The invention also relates to a method for assisting with keeping a motor vehicle in a traffic lane of a road, comprising:

an operation of detecting a singular zone of the road within which the number of traffic lanes increases or decreases, according to a detecting method such as the aforementioned, and a step of determining a steering-angle setpoint for the steered wheels of the motor vehicle, depending on the computed parameter of detection of the singular zone.

In other words, the LCA function is designed to compute the steering setpoint differently, depending on whether the parameter indicates that the vehicle is in a singular zone or not. It is further designed here to compute this setpoint differently depending on whether the parameter indicates that the vehicle is in a zone of road widening or narrowing.

Preferably, when said parameter indicates that the number of traffic lanes is increasing:

a step is provided of selecting, from two right and left lane separation lines located on either side of the motor vehicle, a first line that diverges the least from the motor vehicle and/or from its path, and, in said determining step, the steering-angle setpoint is determined depending on the position of said first line, and independently of the position of the other of the two right and left lane separation lines.

Preferably, in said determining step, the steering-angle setpoint is determined by assuming that the width of the traffic lane measured before the singular zone does not vary within the singular zone.

Preferably, when said parameter indicates that the number of traffic lanes is decreasing, the steering-angle setpoint is determined depending on the positions of the right and left lane separation lines located after the singular zone.

The invention also relates to a method for parameterizing a computer to assist with keeping a motor vehicle in a traffic lane of a road, comprising:

carrying out, in a real or virtual environment, a training trip during which a test vehicle is driven over road segments comprising singular zones, and during which are stored, on the one hand, position data relating to the position of the test vehicle with respect to the lane separation lines marked on the segment of road travelled, and, on the other hand, information indicating whether said road segment is a singular zone within which the number of traffic lanes increases or decreases, a step of building a database containing, for various successive times, said position data and said stored information, a step of training a recurrent neural network making it possible to determine at least one parameter of detection of a singular zone of the road within which the number of traffic lanes increases or decreases, said recurrent neural network receiving said database by way of training datum, and saving the recurrent neural network to the computer of the motor vehicle.

Of course, the various features, variants and embodiments of the invention can be combined with one another in various combinations, provided that they are not incompatible with one another or mutually exclusive.

DETAILED DESCRIPTION OF THE INVENTION

The description that follows with reference to the appended drawings, which are given by way of non-limiting example, will make it easy to understand of what the invention consists and how it may be implemented.

In the appended drawings:

FIG. 4 is a table illustrating, in another form, the values of the training database of FIG. 3;

FIG. 5 is a graph illustrating variations over time in a first parameter of detection of a singular road zone;

FIG. 6 is a graph illustrating variations over time in a second parameter of detection of a singular road zone;

FIG. 7 is a graph illustrating variations over time in a third parameter of detection of a singular road zone.

FIG. 1 shows a vehicle 100, here a motor vehicle, driving on a road 10.

This vehicle 100 may be of any type, for example an automobile, a truck, etc.

It is intended to operate autonomously or semi-autonomously, to help the driver of the vehicle drive safely.

To this end it comprises a steering system that makes it possible to change the orientation of the steered wheels of the vehicle, and that is controlled by a steering actuator.

The vehicle 100 is further equipped with an image-capturing device (not shown). This image-capturing device is located at the front of the vehicle 100 to capture, at regular intervals, an image containing the road 100 being travelled by the vehicle, and in particular markings painted on the road. To image the road, the image-capturing device may comprise a camera equipped with a wide-angle lens or a series of a plurality of cameras.

The vehicle 100 also comprises a data-processing unit, referred to as the "computer" below. This computer comprises at least a processor, a memory, and input and output interfaces. In practice, it may consist of a plurality of separate units each comprising one processor.

Through its input interfaces, the computer is able to receive images captured by the one or more cameras. Through its output interfaces, the computer is able to control the steering actuator.

Through its memory, the computer stores a computer application, which consists of computer programs comprising instructions that, when executed by the one or more processors, allow the computer to implement the method described below.

The computer is thus in particular able to implement a method for keeping the vehicle in the center of its traffic lane. Such a method is better known as an LCA method (LCA standing for Lane Centering Assist). In summary, this method consists in detecting the position of the center of the traffic lane based on road line markings, and in driving the steering actuator to keep the vehicle in a central position.

As specified above, the computer may comprise separate entities, one of which implements the driver-assisting methods (including the LCA function), and in which the method described below will be programmed. As a variant, the method could be programmed in a separate entity, for example in an entity integrated into the camera.

Figure 1:
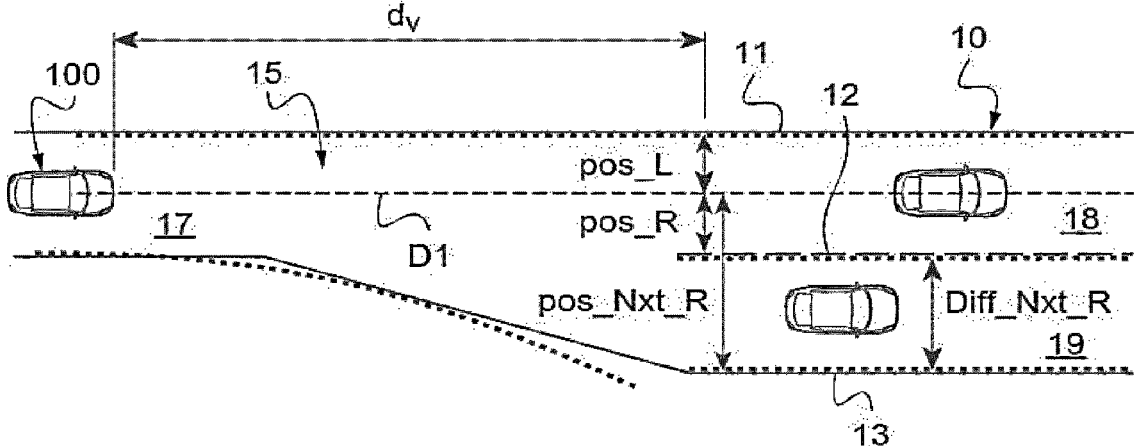
FIG. 1 is a schematic view of a motor vehicle in which a computer configured to implement a driver-assisting method according to the invention is located, and which is being driven over a road segment in front of which a singular zone is located.

FIG. 1 shows one example of a road 10 (country road, street, freeway, etc.) on which the vehicle 100 is being driven.

A road comprises one or more traffic lanes, allowing vehicles to overtake one another or pass by in opposite directions. In the remainder of this description, only traffic lanes of the road the traffic directions of which are the same will be considered.

These traffic lanes are generally separated from one another, from the roadside and from opposite lanes by road line markings, which will be referred to as "lane separation lines" below.

Thus, in the example illustrated in FIG. 1, the vehicle 100 is being driven on a road 10 that, on the left of the figure, comprises a single traffic lane 17 and, on the right, comprises two traffic lanes 18, 19.

These various lanes are delineated (with respect to the roadsides) by two lane separation lines 11, 13, namely a left roadside line 11 and a right roadside line 13. These lines have been shown here as being continuous, but they could as a variant be discontinuous.

The terms "right" and "left" here refer to the right and left of the vehicle 100 when the latter is viewed from behind.

The two traffic lanes 18, 19 are for their part separated by a center line 12 that has been represented by a dashed line but that could be continuous.

The road segment illustrated in FIG. 1 comprises a singular zone 15.

Such a zone is defined as a road segment along which the number of traffic lanes varies, i.e. either increases or decreases. Here, this number increases and hence road widening will be spoken of below. If it decreased, road narrowing would be spoken of instead. In the example illustrated, the number of traffic lanes increases from one to two.

The difficulty in such a singular zone is that the left roadside line 11 and right roadside line 13 gradually diverge and that the center line is not yet marked.

Therefore, if this singular zone is not detected, there is a risk that the vehicle will remain in the middle of the road and thus end up straddling the center line 12.

Consequently, the present invention makes provision to compute the steering setpoint to be sent to the steering actuator in such a way that it is not fooled by a widening of the lane 20.

The method provided comprises two successive operations, including an operation of detecting a singular zone and then, when such a zone has been detected, an operation of computing the steering setpoint to take the presence of this singular zone into account.

The detecting operation is implemented by the computer in a number of steps, which are repeated again and again at regular time increments.

The first step consists in reading data on the positioning of the motor vehicle 100 on the road 10.

The processor is in particular programmed to detect, based on the captured images, the position of the center line 12 and of the left and right roadside lines 11, 13 with respect to the vehicle 100, i.e. with respect to a reference frame tied to the vehicle 100. To this end, the processor is programmed to implement known image-processing algorithms.

By way of example, here, as shown in FIG. 1, the vehicle 100 is driving in a straight line along a main path D1. The main path D1 therefore corresponds to the direction of the vehicle 100 when the latter is driving in a straight line. In a bend, this path would be curved.

The computer is then able to compute, at a determined viewing distance $d_v$ in front of the vehicle, the distance between the main path D1 and each road line marking.

The viewing distance $d_v$ may be predetermined and set (for example equal to 100 meters) or it may vary depending on the speed of the vehicle (it may for example be a distance that the vehicle travels in a given lapse of time, for example equal to one second).

Here, in each time increment, the computer determines at the viewing distance $d_v$:

the distance pos_L between the main path D1 and the left line (the one immediately beside the vehicle), the distance pos_R between the main path D1 and the right line (the one immediately beside the vehicle), the distance pos_Nxt_L between the main path D1 and the left roadside line, and the distance pos_Nxt_R between the main path D1 and the right roadside line.

In the example illustrated in FIG. 1, it will be noted that the distances pos_L and pos_Nxt_L are equal since the left line and left roadside line are one and the same.

Figure 2:
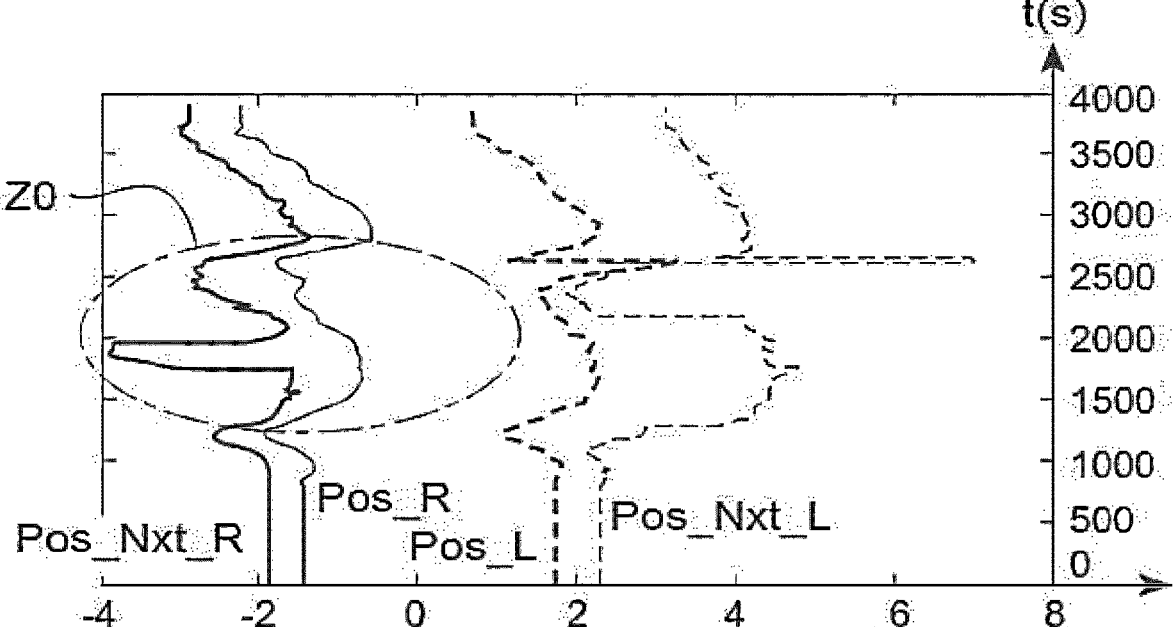
FIG. 2 is a graph illustrating variations in data on motor-vehicle position on a road.

In another example illustrated in FIG. 2, the variations in these four distances over time t (on a road segment different from the one illustrated in FIG. 1) have been shown. It may be seen that in the zone Z0 the distance pos_Nxt_R exhibits a large variation with respect to the distance pos_R, this allowing a singular zone to be detected. It is therefore proposed to detect a singular zone on the basis of the difference between these distances. To do this, the computer determines, in each time increment:

the difference Diff_Nxt_L between the distance pos_L and the distance pos_Nxt_L, and the difference Diff_Nxt_R between the distance pos_R and the distance pos_Nxt_R.

Next, in a second step, the computer computes, by means of a recurrent neural network, at least one parameter Ps, Pm, Po of detection of a singular zone 15.

These parameters are here levels of probability that the vehicle is located in a singular zone or not.

Three parameters are computed here, namely:

a parameter Ps of probability of occurrence of road widening, a parameter Pm of probability of occurrence of road narrowing, a parameter Ps of probability of absence of road widening or narrowing.

As will be explained later on in the description, these parameters will potentially be used to compute a steering setpoint for the vehicle, allowing the latter to correctly remain at the center of its traffic lane and to cross singular zones without difficulty and without danger.

Before that topic is addressed however, the neural network used and the way in which this network is adjusted (training or learning being spoken of) should be described.

The neural network used here is a recurrent neural network (better known by the acronym RNN). It thus allows results to be delivered that depend on the inputs delivered to the network in the current time increment, but also on the inputs delivered in previous time increments.

Here, the chosen attention mechanism is long short-term memory (LSTM). Such a mechanism allows a neural network to be trained effectively using training sequences of long durations.

More precisely, this neural network here comprises an input layer, an output layer and two hidden layers, one of which comprises the attention mechanism.

The input layer comprises at least four neurons in order to receive the values of the distances pos_L and pos_R and of the differences Diff_Nxt_L and Diff_Nxt_R. Here it comprises eight thereof (see FIG. 4) in order to receive:

the value of time increment t, (i being an index varying between 0 and N, where N depends on the length of the sequence in question), the values of the distances pos_L and pos_R, the values of the differences Diff_Nxt_L and Diff_Nxt_R, the values of the parameters $PS_{ti-1}$, $Pm_{ti-1}$, $Po_{ti-1}$ computed in the previous time increment.

The first hidden layer, which receives as input the values transmitted by the neurons of the input layer and which comprises the LSTM attention mechanism, here comprises several tens of neurons. This number is preferably between 30 and 70, and is here equal to 50, in order to obtain reliable results without however generating computational overload.

The second hidden layer is here a densification layer that receives as input the outputs of the fifty neurons of the first hidden layer and that comprises a number of neurons equal to the number of parameters to be computed (here equal to three).

The output layer could be formed by this densification layer.

However, in order to facilitate development of the neural network and to obtain results that are substantially more reliable, this output layer is a three-neuron activation layer, located behind the densification layer.

This activation layer applies a softmax function. More precisely, its neurons are able to compute a 3-dimensional output vector, the values $Y_j$ of which correspond to the values of the parameters Ps, Pm, Po. Its neurons receive as input a 3-dimensional input vector X, and it is possible to write:

$$Y_j = \frac{e^{X_j}}{\sum_{k=1}^{3} e^{X_k}} \qquad \text{[Math. 1]}$$

This recurrent neural network having been clearly described, how it is trained (i.e. how the values of weights and biases assigned to each neuron are adjusted) will now be briefly explained.

The neural network is trained, via error-gradient back-propagation, on a training set.

The training set corresponds to available data values.

In order to obtain this training set, provision is made to drive a test vehicle over roads containing singular zones 15 and to record the distances pos_L, pos_R, pos_Nxt_L, pos_Nxt_R on road sections each comprising one of these singular zones. The recording is carried out in the same way as mentioned above, at a viewing distance $d_v$.

The obtained training set then comprises a plurality of sequences each corresponding to driving through a singular zone, from upstream to downstream thereof.

It will be noted that these test drives may be carried out in a real environment or in a virtual environment.

Figure 3:
FIG. 3 is a table illustrating a database for training a neural network.

As shown in FIG. 3, it is possible to store the data obtained from each driving sequence in a table of a database 200. It is thus possible to record therein:

the value of the time increment $t_i$, the values of the distances pos_L and pos_R (denoted $d1_{ti}$ and $d2_{ti}$), the values of the differences Diff_Nxt_L and Diff_Nxt_R (denoted $d3_{ti}$ and $d4_{ti}$).

Preferably, these distance and difference values are normalized so that they all have values between 0 and 1.

A tool known as MinMaxScaler may be used to this end.

This tool makes it possible, when the table of the database 200 has been filled, to perform in succession, on each of the four columns (here on the column pos_L), a computation of the following type:

$$d1_{ti} = \frac{d1_{ti} - \min(pos_L)}{\max(pos_L) - \min(pos_L)}, \qquad \text{[Math. 2]}$$

with i varying from 0 to N

Provision is then made to complete the last three columns of this table with information indicating whether the number of traffic lanes varied or not, at each time of the sequence in question.

Here, these last three columns of the table of the database 200 are more precisely completed by assigning a value $Ps_{ti}$, $Pm_{ti}$, $Po_{ti}$ to each parameter Ps, Pm, Po for each time $t_i$.

For example, these values are entered manually.

To this end, in the absence of a singular zone, the value 0 is assigned to the parameters Ps and Pm and the value 1 is assigned to the parameter Po.

In the presence of a singular zone in which the road widens, the value 0 is assigned to the parameters Po and Pm and the value 1 is assigned to the parameter Ps. However, at the moment when road widening begins, the value assigned to the parameter Ps increases linearly to reach the value 1 before the end of the singular zone. Conversely, the value assigned to the parameter Po decreases linearly to reach the value 0 before the end of the singular zone. At the moment when widening ends, the value assigned to the parameter Ps drops sharply to 0 while the value assigned to the parameter Po increases sharply to be equal to 1.

In the presence of a singular zone in which the road narrows, the value 0 is assigned to the parameters Po and Ps and the value 1 is assigned to the parameter Pm. However, at the moment when road narrowing begins, the value assigned to the parameter Pm increases linearly to reach the value 1 before the end of the singular zone. Conversely, the value assigned to the parameter Po decreases linearly to reach the value 0 before the end of the singular zone. At the moment when narrowing ends, the value assigned to the parameter Pm drops sharply to 0 while the value assigned to the parameter Po increases sharply to be equal to 1.

Thus, it is possible to complete the database 200 illustrated in FIG. 3.

To train the neural network, the values associated with each row of this database could be submitted thereto in succession, so as to teach it to deliver as output values of the parameters Ps, Pm, Po consistent with the measured distance and difference values.

However, here, to obtain a more responsive and accurate neural network, provision is first made to rearrange the data entered into the database 200.

To do this, in a time-shifting step, a new database 201 is generated (see FIG. 4).

This new database 201 has eleven fields, namely:

the value of the time increment $t_i$, the values $Ps_{ti}$, $Pm_{ti}$, $Po_{ti}$ of the parameters entered at the corresponding time $t_i$, the values $d1_{ti}$, $d2_{ti}$ of the distances pos_L and pos_R, the values $d3_{ti}$, $d4_{ti}$ of the differences Diff_Nxt_L and Diff_Nxt_R, and the values $Ps_{ti+1}$, $Pm_{ti+1}$, $Po_{ti+1}$ of the parameters entered at the corresponding time $t_{i+1}$.

This shifting step makes it possible to provide the network with its attention capacity. Specifically, the values of the first eight columns acquired at the time t, are thus associated with values of the parameters computable at the time $t_{i+1}$.

The last three fields of this table are thus used to carry out the backpropagation that will allow adjustment of the weight and bias values assigned to each neuron.

The optimization algorithm chosen for this purpose here is known as the Adam optimization algorithm (which is an extension of the method called stochastic gradient descent). Specifically, this method has demonstrated acceptable results both in terms of speed and in terms of convergence.

This algorithm uses a cost function Fc, which here is equal to the mean absolute error (MAE), which may be written:

$$Fc = \frac{1}{N}\sum_{i=1}^{N}|y_i - \hat{y}_i| \qquad \text{[Math. 3]}$$

In this equation:

N is the number of time increments in the sequence in question, $y_i$ is the expected value, such as given by one of the last three fields in the new database 201, and $\hat{y}_i$ is the value predicted by the neural network during training.

This training is carried out in steps, in a loop. To know when to stop training, provision is made to regularly evaluate the neural network using another database (obtained as the new database 201, but based on other test-vehicle driving sequences).

To this end, the values of the first eight fields of this other database are delivered as input to the neural network, in the various time increments, and the difference between the results obtained (the predicted values $\hat{y}'_i$) and the expected results $(y'_i)$ given by the last three fields of this other database is observed.

The mathematical mean-squared-error function Fm is used to carry out this evaluation, which is expressed here in the following form.

$$Fm = \sqrt{\frac{1}{N}\sum_{i=1}^{N}(y'_i - \hat{y}'_i)^2} \qquad \text{[Math. 4]}$$

The network may then continue to be trained by submitting new sequences thereto provided that the result of this mathematical function Fm is greater than a threshold, and training may be stopped when the result of this mathematical function drops below this threshold.

Thereafter, the neural network is considered to be trained and ready for use. It may therefore be exported and stored in the memory of the computer of the motor vehicle 100.

It will thus be understood how, using this neural network, the computer is able to determine whether or not the vehicle is located in proximity to a singular zone 15.

Specifically, it is enough to submit thereto, at regular time intervals (preferably the same interval used when training the network), the values of the distances and differences measured and the values of the parameters computed in the previous time increment.

The vehicle is then considered to be facing a widening in the road if the parameter Ps has a value greater than 0.9, or facing a narrowing in the road if the parameter Pm has a value greater than 0.9.

FIGS. 5 to 7 illustrate the variation in the parameters obtained when the motor vehicle 100 is travelling over a road such as the one illustrated in FIG. 1. It may be seen in FIG. 5 that the neural network makes it possible to detect the widening in the road without difficulty, at a time when the other two parameters Pm, Po have substantially zero values. It may further be seen in FIGS. 5 and 7 that the parameters Ps, Po vary substantially linearly when the vehicle 100 is in proximity to the widening in the road. This is normal since the neural network was trained by submitting thereto values that varied in this way as each singular zone 15 was approached.

At this stage, the neural network employed and the way in which it was trained have been clearly described.

This trained neural network is then recorded in every motor vehicle of same model as the test vehicle, and in particular in the motor vehicle 100.

As explained in the first part of this description, the motor vehicle 100 is then able to implement two successive steps, namely:

a step that consists in reading data on the positioning of the motor vehicle 100 on the road 10, and a step in which the computer computes, by means of a recurrent neural network, at least three parameter Ps, Pm, Po of detection of a singular zone 15.

Thus, the computer is able to detect a singular zone 15.

Once the singular zone 15 has been detected, provision is made to implement the process for keeping the vehicle 100 in the center of its traffic lane.

Outside singular zones, this process is well known and consists in keeping the center of gravity of the vehicle equidistant from the right and left lane separation lines located immediately on either side of the motor vehicle 100.

When a singular zone 15 is detected, this process is modified so that the motor vehicle 100 does not straddle two lanes.

The case of a widening in the road such as that illustrated in FIG. 1 may then first be considered.

In such a case, in a second operation, the computer implements steps:

of acquiring the main path D1 of the motor vehicle 100, of selecting, from right and left lane separation lines located immediately on either side of the motor vehicle 100, a first line 11 that diverges the least from the main path D1, and of guiding the motor vehicle depending on the position of the first line 11.

The selecting step thus simply consists in observing whether the distance between the path and the left line is less than the distance between the path and the right line at the viewing distance $d_v$. In this case (the case of FIG. 1), the first line selected is the one on the left, this making it possible to keep the vehicle in the left lane. Otherwise, the first line selected is the one on the right, this making it possible to keep the vehicle in the right lane.

Once the first line 11 has been selected, the vehicle 100 is guided depending on the position of this first line, without taking into account the position of the other line 13 at the viewing distance $d_v$.

In this case, the guidance may for example consist in following the first line 11 at a determined distance. This determined distance may for example be the distance at which the vehicle 100 was from the first line 11 when the widening was detected.

In practice, since the LCA function requires, in order to operate, two road line markings to be detected, the position of the first line and the position of a virtual second line may be submitted to the algorithm. This virtual second line will then be drawn in such a way as to lie parallel to the first line, at a distance therefrom equal to the width of the traffic lane measured upstream of the lane widening.

In this way, the LCA function makes it possible to determine a control setpoint for the steering actuator of the vehicle that is suitable for crossing a zone in which the road widens.

Other ways of determining this control setpoint are described in document FR3109920 and could also be used.

The case of lane narrowing may now be considered.

When the computer detects such a narrowing, it determines whether the traffic lane taken upstream of the narrowing remains beyond the narrowing. If such is the case, the computer determines the control setpoint so as to keep the vehicle in its traffic lane, considering the positions of the two lane separation lines located beyond the narrowing. If such is not the case, the vehicle may be steered so as to position it between the two line markings marking the nearest traffic lane remaining beyond the lane narrowing, as soon as it arrives in the singular zone.

Other methods could of course be employed.

At this stage, it will be noted that the widening or narrowing in the road may be caused by an error in detection of a line: this is then called virtual widening or narrowing. Specifically, a shadow or reflection may be confused with a road line marking. In such a situation, the computer will allow the zone to be crossed without difficulty, in the same way as if there were an actual enlargement or narrowing.

The present invention is in no way limited to the embodiment that has been described and shown, and those skilled in the art will be able to add thereto any variant according to the invention.

In particular, the singular zone detection may be used for purposes other than keeping the vehicle in the center of its lane. For example, this detection could deliver useful data to other advanced driver-assistance functions of the vehicle, such as in particular the obstacle-avoidance function (the indication of a singular zone potentially helping with finding a path avoiding an obstacle lying on the road).

The invention claimed is:

1. A method, implemented by a system installed on a motor vehicle with an autonomous driving capability, for detecting, on a road being travelled by the motor vehicle, a singular zone within which a number of traffic lanes changes, the method comprising:

capturing, by an image-capturing device, images of a road being travelled by the motor vehicle, reading, based on the captured images, position data characterizing a position of the motor vehicle with respect to lane separation lines marked on the road; and computing, by a recurrent neural network, at least one parameter of detection of the singular zone, the read position data being delivered as input to said recurrent neural network, wherein the position data includes (i) a distance between a main path of the road and a left separation line beside the motor vehicle, (ii) a distance between the main path of the road and a right separation line beside the motor vehicle, (iii) a distance between the main path of the road and a left separation line ahead of the motor vehicle, and (iv) a distance between the main path of the road and a right separation line ahead of the motor vehicle.

2. The detecting method as claimed in claim 1, wherein at least two parameters are computed, including a parameter of detection of an increase in the number of traffic lanes, and a parameter of detection of a reduction in the number of traffic lanes.

3. The detecting method as claimed in claim 1, wherein said parameter is a level of probability that a zone of the road is the singular zone.

4. The detecting method as claimed in claim 1, wherein the recurrent neural network comprises an input layer, an output layer, and at least a first hidden layer comprising an attention mechanism.

5. The detecting method as claimed in claim 4, wherein the attention mechanism is of LSTM type.

6. The detecting method as claimed in claim 4, wherein said first hidden layer comprises several tens of neurons.

7. The detecting method as claimed in claim 4, wherein the output layer is an activation layer and at least one densifying other hidden layer, which is located after said first hidden layer and in which a number of neurons is equal to a number of neurons in the output layer, is provided.

8. A method for assisting with keeping a motor vehicle in a traffic lane of a road, comprising:

the detecting method as claimed in claim 1; and determining a steering-angle setpoint for steered wheels of the motor vehicle, depending on the computed parameter of detection of the singular zone.

9. The assisting method as claimed in claim 8, wherein, when said parameter indicates that the number of traffic lanes is increasing, the assisting method further comprises selecting, from two right and left lane separation lines located on either side of the motor vehicle, a first line that diverges the least from the motor vehicle and/or from a path of the motor vehicle, and wherein in said determining, the steering-angle setpoint is determined depending on the position of said first line, and independently of the position of the other of the two right and left lane separation lines.

10. The assisting method as claimed in claim 9, wherein, in said determining, the steering-angle setpoint is determined by assuming that a width of the traffic lane measured before the singular zone does not vary within the singular zone.

11. The assisting method as claimed in claim 8, wherein, when said parameter indicates that the number of traffic lanes is decreasing, the steering-angle setpoint is determined depending on the positions of the right and left lane separation lines located after the singular zone.

12. The detecting method as claimed in claim 1, wherein said at least one parameter includes:

a parameter of probability of occurrence of road widening, a parameter of probability of occurrence of road narrowing, and a parameter of probability of absence of road widening or narrowing.

13. The detecting method as claimed in claim 1, wherein the reading and computing steps are performed at each of a plurality of regular time increments.

14. A method, implemented by a system installed on a test vehicle with an autonomous driving capability, for parameterizing a computer to assist with keeping a motor vehicle in a traffic lane of a road, comprising:

carrying out, in a real environment, a training trip during which the test vehicle is driven over road segments comprising singular zones;

capturing, by an image-capturing device, images of a road being travelled by the test vehicle, reading and storing, based on the captured images, position data relating to a position of the test vehicle with respect to lane separation lines marked on a segment of road travelled and predetermined information indicating whether said road segment is a singular zone within which a number of traffic lanes increases or decreases;

building a database containing, for various successive times, said position data and said stored information;

training a recurrent neural network making it possible to determine at least one parameter of detection of the singular zone of the road within which the number of traffic lanes increases or decreases, said recurrent neural network receiving said database by way of training datum; and saving the recurrent neural network to the computer of the motor vehicle, wherein the position data includes (i) a distance between a main path of the road and a left line beside the test vehicle, (ii) a distance between the main path of the road and a right line beside the test vehicle, (iii) a distance between the main path of the road and a left line ahead of the test vehicle, and (iv) a distance between the main path of the road and a right line ahead of the test vehicle.

\* \* \* \* \*